Aug. 24, 1926.
C. H. TEEGARDEN
INDICATOR MECHANISM
Filed July 10, 1924   2 Sheets-Sheet 1
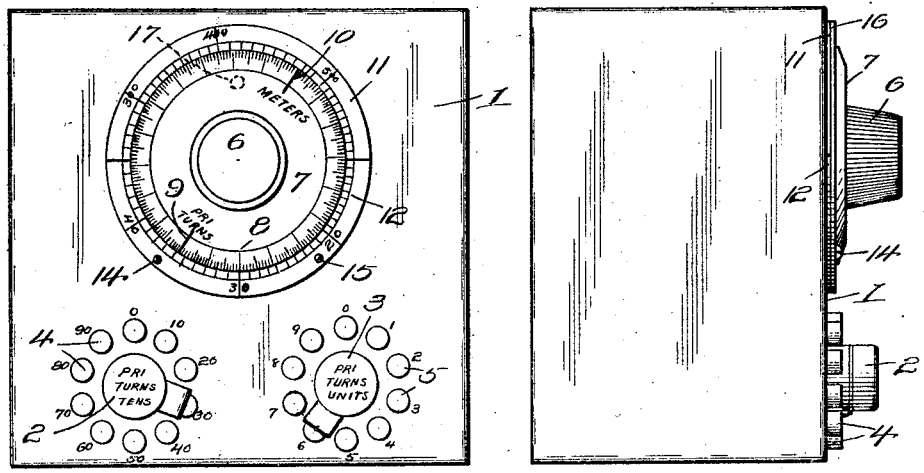
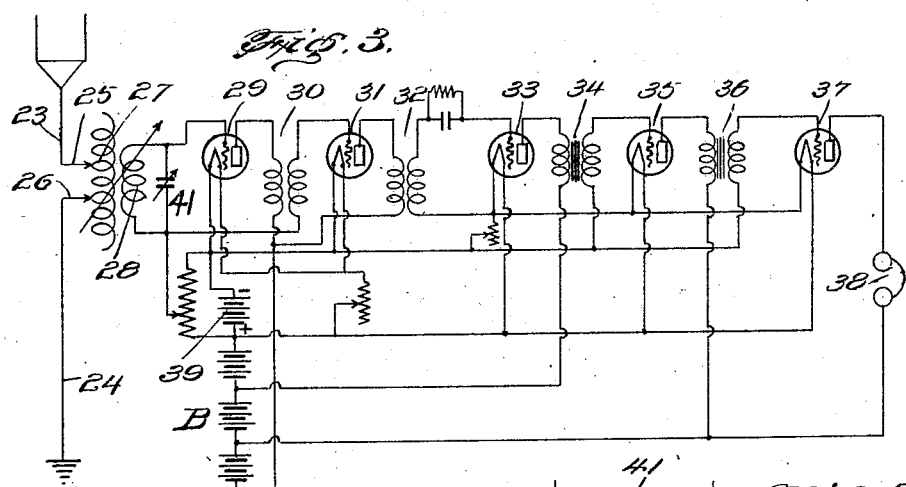
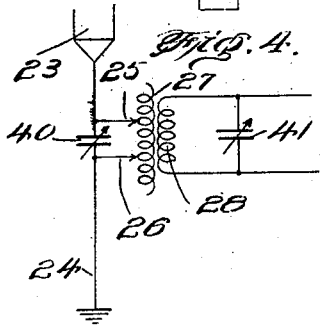
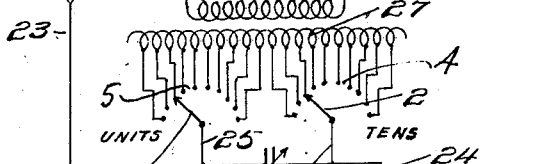
INVENTOR.
CHESTER H. TEEGARDEN.
BY John B. Brady
ATTORNEY Aug. 24, 1926.
C. H. TEEGARDEN
1,597,120
INDICATOR MECHANISM
Filed July 10, 1924          2 Sheets-Sheet 2
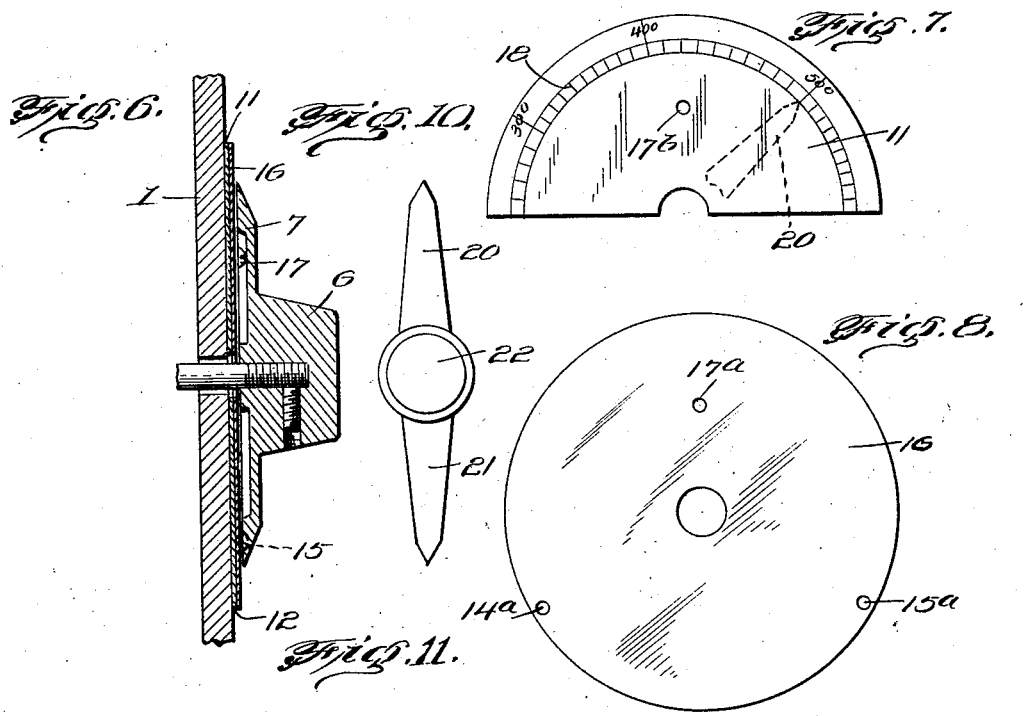
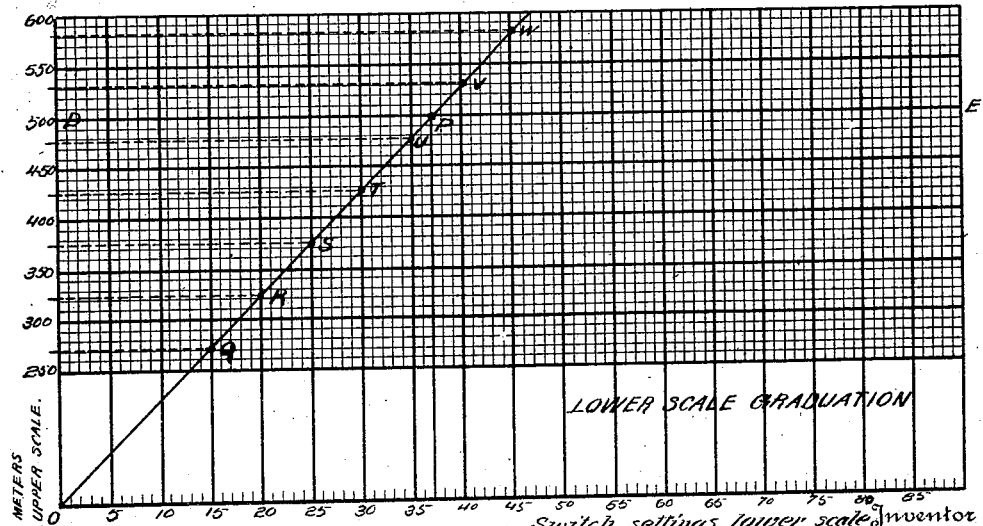
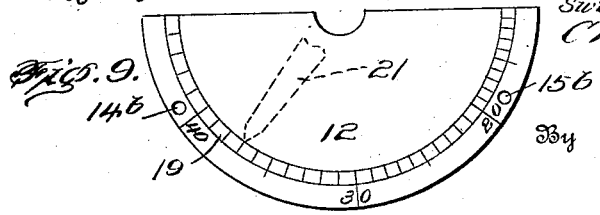

Patented Aug. 24, 1926.

1,597,120

UNITED STATES PATENT OFFICE.

CHESTER H. TEEGARDEN, OF BUFFALO, NEW YORK.

INDICATOR MECHANISM.

Application filed July 10, 1924. Serial No. 725,271.

My invention relates broadly to indicator mechanism and more particularly to an arrangement of calibrated scales and cooperating rotary switch devices whereby the positioning of the indicator mechanism will enable the switch mechanism to be placed in desired positions.

One of the objects of my invention is to provide a rotary indicating mechanism in which a dial carrying a calibrated scale may be moved to various positions giving indications as to the positioning of associated rotary mechanism required for particular settings of the rotary dial.

Another object of my invention is to provide a rotary indicating mechanism comprising a pair of indicator scales each covering approximately 180 degrees but calibrated differently one from the other with one of the scales calibrated in accordance with associated rotary mechanism whereby an indicator moves over said scales and gives readings upon each of said scales, one set of such readings enabling the associated rotary mechanism to be moved to positions corresponding to the scale readings.

Still another object of my invention is to provide a central control indicator having a plurality of adjustable mechanisms, the central control indicator having a pair of differently calibrated scales.

A still further object of my inventions is to provide a construction of rotary indicator mechanism with removable scale members which may be readily calibrated for operation with any desired associated adjustable mechanism when the indicator mechanism is assembled with such other mechanism preparatory to placing the apparatus in permanent operation.

My invention finds particular application in the adjustment of electrical circuits of many varieties. I have elected to describe my invention with reference to a radio receiving apparatus although I desire that it be understood that I do not intend to limit my invention for operation with such apparatus but that it may be used with equal efficiency in radio transmitting systems or other electrical circuit arrangements where a plurality of adjustable means are normally operated one independently of the other. My invention provides a central indicator mechanism by which the positions of the associated adjustable mechanism are immediately determined upon movement of the central indicator.

My invention will be more fully understood from the following specification by reference to the accompanying drawings, in which:

Figure 1 is a front elevation illustrating the application of my invention upon the panel of a radio receiving apparatus; Fig. 2 is a side elevation of the indicator mechanism represented in Fig. 1; Fig. 3 is a wiring diagram showing a circuit arrangement for a radio receiving apparatus which may be controlled by the indicator mechanism of my invention; Fig. 4 is a theoretical diagram illustrating the arrangement of electrical circuits controlled by the rotary mechanism of my invention; Fig. 5 illustrates the electrical relation of the central indicator and the rotary adjustable mechanism as embodied in a radio receiving circuit and controlled by the apparatus of my invention; Fig. 6 is a detailed cross sectional view showing the arrangement of upper and lower scales which I provide at the central indicator; Fig. 7 is a plan view of the upper scale employed in the central indicator; Fig. 8 shows a transparent cover member provided to extend over both the upper and lower scales of the central indicator and secure the same in position, one independent of the other; Fig. 9 is a plan view of the lower scale of the central indicator; Fig. 10 is a modified form of pointer which may be used for operation over the upper and lower scales in lieu of the circular dial indicator illustrated in Figs. 1, 2 and 6; and Fig. 11 shows one method which is employed in calibrating the scales of the central indicator.

In the apparatus of my invention a plurality of independent scale members are employed over which a central indicator is arranged to sweep. The central indicator may be connected with one of the adjustable values of a radio receiving circuit. The other adjustments necessary in the circuits associated with the said adjustable value bearing a definite relation to the value of the first adjustable means. By my arrangement I provide means for indicating the settings of the associated adjustable means required for cooperation with the central indicator adjustment in order that the tuning circuits will operate with best efficiency.

Heretofore in the art the adjustment of electrical circuits such as the tuning circuits of a radio receiver has been dependent upon the change of a plurality of different functions. That is to say the value of inductance and capacity in a radio receiving circuit varies in ratio for different frequencies or wavelengths which are to be received. This has required the independent manipulation of a plurality of adjustable devices. Where signals are to be received throughout the broadcast range of wavelengths, many different stations may be operating simultaneously on closely adjacent wavelengths requiring a change in the position of adjustable switches and rotatable shafts each independent of the other for a great many different settings. In order to secure the high degree of selectivity necessary in a radio receiver and in order to receive a distant station at the same time that a local station may be in operation, the novice must often hunt for the proper setting of the several variable functions and in so doing may accidentally pass over the desired setting. The independent adjustment of devices at the different values in a radio receiving system is a problem which offers serious complications to the novice unskilled in the art. By my arrangement of calibrated dials the operator may tell at a glance the required settings for the associated instrument dials or shafts in order to receive a station operating upon a known frequency or wavelength.

Referring more particularly to the drawings, reference character 1 represents the panel of a radio receiving apparatus upon which there is mounted rotatable switches 2 and 3. The switch 2 passes over a set of contacts 4 each numbered as represented, the switch 3 passes over a row of contacts 5 each numbered throughout a smaller range as represented. That is to say the contacts 4 may include portions of inductance 27 in increments of 10 turns each, while the contacts 5 may be connected to portions of the inductance 27 by increments of unit turns. The central indicator is represented as having a knob 6 and a dial 7 which may bear calibrations 8 with indexes 9 and 10 diametrically opposite from one another, 180 degrees apart. Upper and lower semi-circular scales 11 and 12 are secured to the panel 1 and a transparent disk 16 placed over the scales by means of screws 14, 15 and 17 passing through apertures 14ª, 15ª and 17ª respectively in the transparent disk 16 and apertures 14ᵇ, 15ᵇ and 17ᵇ in the removable scales 11 and 12 respectively. The scale 11 is fixed permanently in position by means of the screw 17 having its head covered by the dial 7. The scale 12 is readily removable and replaceable by taking out screws 14 and 15 and replacing the same after the scale has been calibrated for the particular apparatus with which the instrument is employed. The scale 11 is calibrated as represented at 18 in Fig. 7 in terms of meters or kilocycles covering the range for which the particular apparatus is efficient. This wavelength scale is prepared from the published data giving the transmitting characteristics of different stations. The lower scale 12 is provided with calibrations 19 which are prepared for the particular apparatus in which the system is employed as will be hereinafter described.

Referring to Figs. 3, 4 and 5, a representative circuit arrangement for a radio receiving apparatus employing my invention has been shown. An antenna 23 and ground 24 are connected through leads 25 and 26 with primary windings 27 to which is coupled secondary winding 28 tuned by condenser 41. A radio frequency amplifying system may be employed in the receiver consisting of electron tubes 29 and 31 with intervalve coupling transformers 30 and 32. A detector tube 33 may be employed in the system with the output connected to an audio frequency amplifier consisting of tubes 35 and 37 coupled by means of transformers 34 and 36. The responsive device, such as a loud speaker or a head telephone set is connected in the output circuit of the amplifier. The filaments may be supplied from battery 39 while the plate potential for the several tubes may be supplied from the B battery as represented. The tuning system employed in the receiver as shown more clearly in Fig. 5 where the leads 25 and 26 connect with rotatable switch blades 2 and 3 to cut in increments of values of units and tens of inductance 27. The secondary condenser 41 is operated by the central control indicator knob 6. In order that the lower scale 12 may be calibrated as represented at 19 when the apparatus is constructed without requiring calibration after the set is installed I may provide an antenna compensating condenser 40 which may be adjusted after setting of switches 2 and 3 in accordance with the reading of scales 11 and 12, to a position of maximum signal reception. While I have illustrated in Figs. 1, 2 and 6 an arrangement of central indicator where a circular dial 7 is employed I may provide a double ended indicator as shown in Fig. 10 having diametrically opposed pointers 20 and 21 operated from knob 22. In Figs. 7 and 9 I have shown the end 20 of the indicator in dotted lines bearing upon a 500 meter scale reading on calibration 18 while the end 21 of the indicator is shown in dotted lines in Fig. 9 bearing upon scale reading 37 of calibration 19. This immediately indicates to the operator that for the reception of a 500 meter wave the switches 2 and 3 must be placed on contacts which will equal 37 to give that amount of inductance 27 in the antenna circuit which is required to operate with a particular setting of condenser 41. The calibration of the scale 12 will be more fully understood by reference to the chart in Fig. 11 where the ordinates represent the wavelength in meters on the upper scale 11 shown by calibration 18. The abscissa represents the general divisions of the lower scale 12 for the setting of switches 2 and 3. Without an antenna compensating condenser 40 this lower scale would have to be marked after the apparatus is connected ready to use as this scale depends for its marking on the kind and size of antenna used. Switches 2 and 3 should each be placed on zero with indicator 20 on the scale reading 500 as represented in Fig. 7. The switches 2 and 3 should then be advanced one point at a time counting from 0 to 9 on units switch 3 before advancing tens switch 2 to the necessary point. This movement should be continued until a point is reached just below the point of oscillation. The switches 2 and 3 should then again be advanced to a point where oscillations commence again. A point intermediate these two readings will be found where the oscillations will cease. The quiet point is the correct point for the switch setting. This is marked as point P on the chart in Fig. 11. A line OP is drawn through the zero point on the abscissa and through point P on the 500 meter line DE. The line OP will then indicate the wavelength dial setting for each fifth switch point as, 10, 15, 20, 25 etc. Through each point where line OP intersects with heavy vertical lines as the points Q, R, S, T, U, V, W, draw a horizontal line to the ordinate to find the corresponding dial reading 18. That is to say the dial reading 18 for switch point 25 is point S, that is, 375 meters. The scales are prepared by setting the zero line on the upper scale and with a pencil marking the corresponding readings on the lower scale 12. For each fifth switch point the lower scale is marked as indicated by line OP in Fig. 11. The scale 12 is then removed from beneath the circular protector 16 by removing screws 14 and 15 and the scale finished with pencil or ink, filling in the intermediate points equally spaced between the marked fifth points. By making the lines for each fifth and tenth point longer and numbering the tenth points, the scale may be easily read. The completed scale can then be slipped under the transparent or celluloid cover plate 16 beneath the dial and the screws 14 and 15 replaced. If the antenna is changed a new lower scale may be cut and graduated for the new antenna in the manner as outlined or the compensating condenser 40 may be employed to bring the circuits in resonance with the incoming signals.

Where the scale is prepared when the set is constructed the calibration as outlined is unnecessary by the individual user and the antenna compensating condenser 40 will be found to render the receiving circuit selective. It will be understood that in lieu of the method outlined above I may calibrate the scale 19 by employing a wavemeter producing a desired constant frequency for particular scale settings to enable the proper switch settings to be readily obtained and marked upon scale 12.

It will be observed that the apparatus herein has an efficient form of rotary indicating mechanism by which a novice unskilled in the art may quickly adjust a plurality of independent functions from a central indicator.

While I have described the invention in certain particular embodiments I desire that it be understood that modifications may be made and that I intend no limitations upon the invention other than are imposed by the scope of the appended claims.

What I claim and desire to secure by Letters Patent of the United States is as follows:

1. An indicator mechanism having a plurality of independently adjustable mechanisms, comprising in combination an adjustable member, a plurality of changeable scales arranged adjacent to said adjustable member, one of said scales being marked with an independent series of calibrations and the others of said scales being marked in terms of the movements of said independently adjustable mechanisms whereby positions of said first mentioned adjustable member over said first mentioned scale have corresponding position indications on said second mentioned scale, indicating the required settings of the said independently adjustable mechanisms corresponding to the setting of the first mentioned adjustable member.

2. An indicator mechanism having a plurality of independently adjustable mechanisms, comprising in combination a rotatable member, a plurality of semi-circular independent scales removably located on either side of said rotatable member, one of said scales carrying calibrations of a predetermined order and another of said scales carrying calibrations in terms of the required portions of said independently adjustable mechanisms whereby said independently adjustable mechanism may be set in positions corresponding to indication readings of said rotatable member over said calibrations of a predetermined order.

3. An indicator mechanism having a plurality of independently adjustable mechanisms, comprising in combination a central rotatable shaft, an indicator member carried by said shaft, a plurality of independent changeable scales, one positioned on one side of said rotatable shaft and another positioned on the other side of said rotatable shaft, said first mentioned scale being calibrated in a predetermined series and said second mentioned scale being calibrated in accordance with the positions of a plurality of independently adjustable mechanisms whereby movement of said indicator over said scales enables readings of said indicator over said first mentioned scale to be directly compared with readings of said indicator over said second mentioned scale establishing a value for the setting of said independently adjustable mechanism in positions required for cooperative control of all of said mechanisms.

4. An indicator mechanism having a plurality of independently adjustable mechanisms, comprising in combination a rotatable shaft, an indicator secured to said shaft, a plurality of independent scale members removably mounted on opposite sides of said rotatable shaft and each carrying an independent series of calibrations and means overlying each of said scale members for securing said scale members in position beneath said indicator.

5. An indicator mechanism having a plurality of independently adjustable mechanisms, comprising in combination a rotatable shaft, an indicator secured to said shaft, a plurality of independent scales mounted on opposite sides of said rotatable shaft, one of said scales being adapted to be permanently fixed in position and another of said scales being arranged to be readily removed and replaced in position whereby said last mentioned scale may be calibrated in terms of said adjustable mechanisms in accordance with readings of said indicator upon said first mentioned scale.

6. An indicator mechanism comprising in combination a central rotatable member connected with an adjustable means, a plurality of independent rotatable members forming separate adjustable means positioned adjacent said first mentioned means, a pair of independent changeable scales mounted on opposite sides of said central rotatable member, one of said scales being readily removable with reference to the other of said scales and independent calibrations carried by each of said scales, said removable scale being calibrated in terms of said separate adjustable means and the other of said scales being calibrated in accordance with a predetermined series whereby movement of said central rotatable member over said scales permits settings of said separate adjustable means in accordance with readings of said predetermined series.

7. A rotary indicator mechanism comprising in combination a rotatable shaft, a double ended indicator carried by said shaft, a pair of semi-circular members removably positioned on opposite sides of said shaft and each carrying scales thereon, independent calibrations carried by each of said scales and a circular transparent member adapted to overlie each of said scales and secure the same in position with respect to said shaft.

CHESTER H. TEEGARDEN.